United States Patent [19]
Fetcenko et al.

[11] Patent Number: 5,238,756
[45] Date of Patent: * Aug. 24, 1993

[54] ELECTRODE ALLOY HAVING DECREASED HYDROGEN OVERPRESSURE AND/OR LOW SELF-DISCHARGE

[75] Inventors: Michael A. Fetcenko, Rochester Hills; Stanford R. Ovshinsky, Bloomfield Hills, both of Mich.; Kozo Kajita, Shiga, Japan

[73] Assignee: Ovonic Battery Company, Troy, Mich.

[*] Notice: The portion of the term of this patent subsequent to Apr. 7, 2009 has been disclaimed.

[21] Appl. No.: 746,015

[22] Filed: Aug. 14, 1991

Related U.S. Application Data

[63] Continuation-in-part of Ser. No. 515,020, Apr. 26, 1990, Pat. No. 5,104,617.

[51] Int. Cl.⁵ .............................................. H01M 4/38
[52] U.S. Cl. ...................................... 429/59; 429/101; 420/900
[58] Field of Search ................... 429/59, 101; 420/900

[56] References Cited

U.S. PATENT DOCUMENTS

| | | | |
|---|---|---|---|
| 4,551,400 | 11/1985 | Sapru | 429/101 X |
| 4,728,586 | 3/1988 | Venkatesan et al. | 429/101 X |
| 4,849,205 | 7/1989 | Hong | 420/900 X |

Primary Examiner—Stephen Kalafut
Attorney, Agent, or Firm—Marvin Siskind; Marc Luddy; David Schumaker

[57] ABSTRACT

An electrochemical hydrogen storage alloy having decreased hydrogen overpressure as well as other desirable operational parameters, comprising on an atomic percent basis: 14 to 22 percent vanadium; 28 to 39 percent nickel; 7 to 15 percent titanium; 15 to 34 percent zirconium; and at least one member selected from the group consisting of 0.001 to 7 percent chromium, 0.001 to 7 percent cobalt, 0.001 to 7 percent iron, 0.001 to 3.6 percent manganese, and 0.001 to 2.7 percent aluminum, wherein the atomic ratio of the vanadium to zirconium is in the range of 1:2.26 to 1:0.68. An electrochemical hydrogen storage alloy having a reduced self-discharge rate comprising an alloy having a heterogeneous, disordered microstructure resulting from changes in the mutual solubility of the elements of the alloy, wherein hydrogen in a particular phase is not easily discharged either though low surface area, or an oxide of limited porosity or catalytic property.

17 Claims, 1 Drawing Sheet

ELECTRODE ALLOY HAVING DECREASED HYDROGEN OVERPRESSURE AND/OR LOW SELF-DISCHARGE

This application is a continuation-in-part of application Ser. No. 07/515,020 filed on Apr. 26, 1990 now U.S. Pat. No. 5,104,617.

FIELD OF THE INVENTION

The present invention relates to rechargeable electrochemical cells. More particularly, the invention relates to rechargeable cells and batteries having negative electrodes formed of multicomponent, electrochemical hydrogen storage alloys. Cells which incorporate the alloy of the present invention are characterized by superior electrochemical properties, a low hydrogen overpressure, and/or low self-discharge rate under conditions of use.

BACKGROUND OF THE INVENTION

A. Principles of Operation

Secondary cells using rechargeable hydrogen storage negative electrodes are an environmentally non-threatening, high energy density, electrochemical power source. Such hydrogen storage cells operate in a different manner than lead acid, nickel-cadmium, or other battery systems.

A rechargeable hydrogen storage electrochemical cell or battery utilizes a negative electrode that is capable of the reversible electrochemical storage of hydrogen. Hydrogen storage cells usually employ a positive electrode of nickel hydroxide material, although other positive materials may be used. The negative and positive electrodes are spaced apart in an alkaline electrolyte. A suitable separator, i.e., a membrane may also be positioned between the electrodes.

Upon application of an electrical potential across a hydrogen electrochemical cell, the negative electrode material (M) is charged by the electrochemical absorption of hydrogen and the electrochemical evolution of a hydroxyl ion:

$$M + H_2O + e^- \rightarrow M\text{-}H + OH^-.$$

Upon discharge, the stored hydrogen is released to form a water molecule and evolve an electron:

$$M\text{-}H + OH^- \rightarrow M + H_2O + e^-.$$

In the reversible (secondary) cells of the invention, the reactions are reversible.

The reactions that take place at the positive electrode of a secondary cell are also reversible. For example, the reactions at a conventional nickel hydroxide positive electrode as utilized in a hydrogen rechargeable secondary cell are:

$$Ni(OH)_2 + OH^- \rightarrow NiOOH + H_2 + e^- \text{ (Charging)},$$

$$NiOOH + H_2O + e^- \rightarrow Ni(OH)_2 + OH^- \text{ (Discharging)}.$$

A secondary cell utilizing an electrochemically rechargeable hydrogen storage negative electrode offers important advantages over conventional secondary cells and batteries, such as nickel-cadmium cells, lead-acid cells, and lithium cells. First, hydrogen storage secondary cells contain no cadmium, lead, or lithium; and thus, are not a hazard to consumers or to the environment. Second, electrochemical cells with hydrogen storage negative electrodes offer significantly higher specific charge capacities than do cells with lead or cadmium negative electrodes. As a result, a higher energy density is possible with hydrogen storage cells than with conventional systems, making hydrogen storage cells particularly suitable for many commercial applications.

B. AB$_2$ Type Hydrogen Storage Alloys

A variety of hydrogen storage alloys, both electrochemical and thermal, are known in the art. One type of hydrogen storage alloy is the AB$_2$ hydrogen storage alloys. Prior references teach basic C$_{14}$ and C$_{15}$ type Laves phase AB$_2$ materials with (1) one or more of the following elements: Ti, Zr, and Hf; and (2) Ni, generally with one or more additional metals. However, there is no teaching in the prior art of the local metallurgical, chemical, or electrochemical relationships between the various individual metals that can partially substitute for Ti, Zr, and/or Hf; or for Ni. Nor is there any teaching of local, i.e., intra-phase, compositions or the effect of local compositional differences on catalytic properties and key determinants of catalytic properties, such as electron work function.

The earliest AB$_2$ hydrogen storage materials were thermal hydrogen storage alloys. In thermal hydrogen storage alloys, the driving forces for hydriding and dehydriding are thermal and pressure driving forces. In contrast, electrochemical hydrogen storage alloys are hydrided and dehydrided by electron transfer processes in ionic media.

A. Pebler and E. A. Gulbransen, 239 *Transactions of the Metallurgical Society*, 1593-1600 (1967), first reported members of the AB$_2$ class of materials to be the binaries ZrCr$_2$, ZrV$_2$, and ZrMo$_2$. In addition, J. J. Reilly and R. H. Wiswall, in "The Reaction of Hydrogen with Alloys of Magnesium and Nickel and the Formation of Mg$_2$NiH$_4$," 7 *Inorganic Chem.* 2254 (1968), reported that Mg-Ni thermal hydrogen storage alloys were also AB$_2$ thermal hydrogen storage alloys that hydrided and dehydrided by pressure and temperature driven processes and not be electron transfer with an external circuit.

F. H. M. Spit, J. W. Drivjer, and S. Radelar described a ZrNi class of binary thermal hydrogen storage AB$_2$ alloys in "Hydrogen Sorption by the Metallic Glass Ni$_{64}$Zr$_{36}$ and by Related Crystalline Compounds," 14 *Scripta Metallurgica* 1071-1076 (1980); and the thermodynamics of gas phase hydrogen absorption and desorption in the ZrNi$_2$ binary system. Subsequently, Spit, et al. in "Hydrogen Sorption in Amorphous Ni (Zr, Ti) Alloys," *Zeitschrift Fur Physikaisch Chemie Neue Folge Bd.* 225-232 (1979), reported the gas phase hydrogen sorption and desorption kinetics of thermal hydrogen storage processes in Zr$_{36.3}$Ni$_{63.7}$ and Ti$_{29}$Zr$_9$Ni$_{62}$.

Ziconium-manganese binary AB$_2$ thermal hydrogen storage alloys were disclosed, for example, in F. Pourarian, H. Fuji, W. E. Wallace, V. K. Shina, and H. Kevin Smith, "Stability and Magnetism of Hydrides of Nonstoichiometric ZrMn$_2$," 85 *J. Phys. Chem* 3105-3111. Pourarian, et al. describe a class of nonstoichiometric hydrides of the general formula ZrMn$_{2+x}$ where x=0.6, 0.8, and 1.8. (ZrTi)-manganese ternary hydrogen storage alloys were described by H. Fuji, F. Pourarian, V. K. Shina, and W. E. Wallace in "Magnetic, Crystallographic, and Hydrogen Storage Characteristics of $Zr_{1-x}Ti_xMn_2$ Hydrides," 85 *J. Phys. Chem* 3112.

Manganese-nickel binary $AB_2$ thermal hydrogen storage alloys were described for thermal hydrogen storage in automotive applications by H. Buchner in "Perspectives for Metal Hydride Technology," 6 *Prog. Energy Combust.* Sci 331–346.

Ternary zirconium, nickel, manganese $AB_2$ thermal hydrogen storage alloys were described, for example, by A. Suzuki and N. Nishimiya, "Thermodynamic Properties of $Zr(Ni_xMn_{1-x})2-H_2$ Systems," 19 *Mat. Res. Bull.* 1559–1571 (1984). Suzuki, et al. describe the system $Zr(Ni_xMn_{1-x})_2$ where $x=0.2$, 0.5, and 0.8.

Six component $AB_2$ thermal hydrogen storage alloys are described in German Patentschrift DE 31 51 712 C1 for "Titanium Based Hydrogen Storage Alloy With Iron and/or Aluminum Replacing Vanadium and Optionally Nickel," based on German Application DE 31 51 712 filed Dec. 29, 1981 by Otto Bernauer and Klaus Ziegler, and assigned to Daimler Benz AG. The key teaching of Bernauer, et al. are that the vanadium in a six component Ti-Zr-Mn-Cr-V-Ni alloy can be partially replaced by Fe and/or Al to give a lower cost thermal hydrogen storage alloy; that Ni can be partially replaced by Fe to further reduce the cost of the alloy; and that Fe can be used in the alloy without hurting its properties.

Specifically, Bernauer, et al. describe a thermal hydrogen storage alloy having the composition $Ti_{1-a}Zr_aMn_{2-x}Cr_{x-y}(V_zNi_{1-z})_y$, where a is from 0 to 0.33, x is from 0.2 to 1.0, y is between 0.2 and x, and z is from 0.3 to 0.9. This patent discloses that the Ni is partially replaceable by Co and/or Cu, and from 1 to 5 atomic percent of the Ti is replaceable by strong oxygen getters, such as lanthanum and other rare earths. It is further disclosed that up to 20 atomic percent of the vanadium is replaceable by Al, with the provision that no more than 30 atomic percent of the vanadium can be replaced by Fe and Al; and that Ni atoms can be replaced by Fe atoms.

Multicomponent $AB_2$ thermal hydrogen storage alloys of this general are also taught in German Patentschrift DE 30 23 770 C2 for "Titanium Manganese Vanadium Based Laves Phase Material with Hexagonal Structure, Used as Hydrogen Storage Material," based on German Application DE 30 23 770 filed Jun. 25, 1980 and DE 30 31 471 filed Aug. 21, 1980 by Otto Bernauer and Klaus Ziegler, and assigned to Daimler Benz AG. The key teaching of this patent is that the nickel in a six component Ti-Zr-Mn-Cr-V-Ni alloy can be partially replaced by Co and/or Cu to give a lower cost hydrogen storage alloy.

More specifically, the alloys disclosed in DE 30 23 770 have the formula $Ti_{1-a}Zr_aMn_{2-x}Cr_{x-y}(V_zM_{1-z})_y$ in which M is one or more of the following: Ni, Co, and Cu; a is from 0.0 to 0.3; x is from 0.2 to 1.0; y is between 0.2 and the value of x; and the ratio of V to total Ni, Co, and Cu is between 9:1 and 3:2.

Matsushita Electric Industrial Company's U.S. Pat. Nos. 4,153,484 and 4,228,145, to Gamo, Moriwaki, Yamashita, and Fukuda, both entitled "Hydrogen Storage Material," disclose a class of $C_{14}$ type Laves phase materials for the thermal storage of hydrogen. These materials are hydrided by gaseous hydrogen and dehydrided by evolving gaseous hydrogen. The disclosed $C_{14}$ materials have a hexagonal crystal structure with an a lattice dimension of 4.80 to 5.10 Å and a c lattice dimension of 7.88 to 8.28 Å. The thermal hydrogen storage alloys disclosed in these patents contain Ti-Zr-Mn optionally with Mo and/or Cu. These patents require the presence of Mn; are silent as to V, Cr, or Ni; and contain no teaching of additional materials.

Other Laves phase materials are disclosed in Matsushita's U.S. Pat. No. 4,160,014 to Takaharu Gamo, Yoshio Moriwaki, Toshio Yamashita, and Masataro Fukuda for "Hydrogen Storage Material" claiming priority from Japanese Patent Application JP 52-054140 filed May 10, 1977. This patent discloses an $AB_a$ thermal hydrogen storage material where A is at least 50 atomic percent Ti and the balance is Zr and/or Hf; B is at least 30 atomic percent Mn with the balance one or more of the following; Cr, V, Nb, Ta, Mo, Fe, Co, Ni, Cu, and rare earths; and a is from 1.0 to 3.0.

Another class of $AB_2$ thermal hydrogen storage materials is disclosed in U.S. Pat. No. 4,163,666 to D. Shaltiel, D. Davidov, and I. Jacob for "Hydrogen Charged Alloys of Zr $(A_{1-x}B_x)_2$ where A is one or more of the following: V, Mn, or Cr; and B is Fe and/or Co. The patent discloses this material as a hydrogen storage alloy.

Other prior art Laves phase-type hydrogen storage alloys are shown, for example in Matsushita Electric Industrial Co., Ltd.'s U.S. Pat. No. 4,195,989 to Takaharu Gamo, Yoshio Moriwaki, Toshio Yamashita, and Masataro Fukuda for "Hydrogen Storage Material" claiming benefit of Japanese Patent Application JP 53-044677 filed Apr. 14, 1978; and JP 52-130040 filed Oct. 28, 1977. This patent discloses a Laves phase hexagonal Ti-Mn-M alloy where M is one or more of the following: V, Cr, Fe, Co, Ni, Cu, and Mo; where the a lattice dimension is between 4.86 and 4.90 Å; and the c lattice dimension is between 7.95 and 8.02 Å. These materials are disclosed as thermal hydrogen storage alloys.

U.S. Pat. No. 4,397,834 to M. Mendelsohn and D. Gruen for "Method of Gettering Hydrogen under Conditions of Low Pressure" describes a ternary Zr-V-Cr hydrogen storage alloy. This alloy, having the formula $Zr(V_{1-x}Cr_x)_2$, where x is from 0.01 to 0.90, is used to getter or scavenge hydrogen gas.

In U.S. Pat. No. 4,406,874 to William E. Wallace, F. Pourarian, and V. K. Sinha, for "$ZrMn_2$-Type Alloy Partially Substituted with Cerium/Praseodymium/Neodymium and Characterized by $AB_2$ Stoichiometry" discloses a thermochemical hydrogen storage alloy having the formula $Zr_{x-1}M_xMn_2$ where x is between 0.0 and 0.3, and M is Ce, Pr, or Nd. The disclosed material is described as having a hexagonal Laves structure, an a lattice dimension of 5.00 to 5.03 Å, and a c lattice dimension of 8.20 to 8.26 Å. This alloy is disclosed to be a thermochemical hydrogen storage alloy.

All of the $AB_2$ hydrogen storage alloys described above are thermal hydrogen storage alloys.

Prior art Laves phase electrochemical hydrogen storage alloys are shown, for example, in Matsushita Electric Industrial Co., Ltd.'s Laid Open European Patent Application 0 293 660 based on European Patent application 88 10 7839.8 filed May 16, 1988 and claiming priority from Japanese Patent Applications JP 1-19411, JP 1-90698, JP 2-05683, JP 2-18698, and JP 2-58889; and the following Japanese Patents assigned to Matsushita:

1. JP 1-02855, for "Hydrogen Storage Alloy Electrode," issued Apr. 20, 1989 to Moriwaki, Gamo, and Iwaki, and was filed as Japanese Patent Application JP 2-58889 on Oct. 14, 1987. This patent discloses multidimensional hydrogen storage alloys and their hydrides.

The alloys are disclosed to be $C_{15}$ Laves phase type materials. These materials have the general chemical formula $A_xB_yNi_z$ where A is Zr alone, or Zr and Ti and/or Hf, the Ti or Hf being 30 atomic percent or less; $x=1.0$; B is at least one of the following elements: Nb, Cr, Mo, Mn, Fe, Co, Cu, Al, and rare earth elements such as La and Ce; $y=0.5$ to 1.0; $z=1.0$ to 1.5; and the sum of $y+z=1.5$ to 2.5. This patent discloses that compositions of this general formula enhance the hydrogen storing ability of the alloy and suppress the loss of discharge capacity which occurs after repeated charge/discharge cycling (cycle life) of Ti-Ni and Zr-Ni binary systems. This patent contains no teaching of how to choose between Nb, Cr, Mo, Mn, Fe, Co, Cu, Al, La, and Ce substituent elements; or the relative proportions within this class of substituent elements which might yield optimal properties.

2. JP 63-284758, for "Hydrogen Storing Electrode" to Gamo, Moriwaki, and Iwaki issued Nov. 22, 1988, based on Japanese Patent Application JP 62-119411 was filed on May 15, 1987. This patent discloses an alloy which is expressed by the formula $AB_2$, belongs to the Laves phase of intermetallic compounds, and has a cubically symmetric $C_{15}$ structure and a crystal lattice constant in the range of 6.92 to 7.70 Å, where A represents Ti and/or Zr; and B represents V and/or Cr. This patent is silent as to additional substituents or modifiers.

3. JP 89/035863 for "Hydrogen Absorbing Electrode" to Gamo, Moriwaki, and Iwaki issued on Jan. 6, 1989 based on Japanese Patent Application JP 62-190698 filed on Jul. 30, 1987. This patent discloses an alloy of Zr, V, Ni that satisfies the general formula $ZrV_aNi_b$, where $a=0.01$ to 1.20 and $b=1.0$ to 2.5. There is no specific teaching regarding substituents or modifiers.

4. JP 89/048370 for "Hydrogen Absorbing Electrode" to Gamo, Moriwaki, and Iwaki issued on Feb. 22, 1989 based on Japanese Patent Application JP 62-0205683 filed on Aug. 19, 1987. This patent discloses a alloy composition of the general formula $ZrMo_aNi_b$, where $a=0.1$ to 1.2 and $b=1.1$ to 2.5. This reference contains no teaching or suggestion of complex alloys of five or more components.

5. JP 89/060961 for "Hydrogen Absorbing Electrode" to Gamo, Moriwaki, and Iwaki issued on Mar. 8, 1989 based on Japanese Patent Application JP 62-216898 filed on Aug. 31, 1987. This patent discloses an alloy composition of the general formula $Zr_aV_bNi_cM_d$ where a, b, c, and d are the respective atomic ratios of Zr, V, Ni, and M; $a=0.5$ to 1.5; $b=0.01$ to 1.2; $c=0.4$ to 2.5; $d=0.01$ to 1.8; $b+c+d=1.2$ to 3.7; and M is one or more elements selected from the group consisting of Mg, Ca, Y, Hf, Nb, Ta, Cr, Mo, Ti, W, Mn, Fe, Co, Pb, Cu, Ag, Au, Zn, Cd, Al, In, Sn, Bi, La, Ce, Mm, Pr, Nd, and Th. This patent, while it lists 28 metals plus mischmetal, does not teach or suggest any relationship between these metals.

Laid Open European Patent Application 02 93 660 describes hexagonal $C_{14}$ Laves phase materials having a lattice dimension a from 4.8 to 5.2 Å; and a lattice dimension c of from 7.9 to 8.3 Å. The materials have the formula $AB_a$ where A is selected from the group of elements consisting of Zr, Ti, Hf, Ta, Y, Ca, Mg, La, Ce, Pr, Mm, Nb, Nd, Mo, Al, and Si; and B is selected from the group of elements consisting of Ni, V, Cr, Mn, Fe, Co, Cu, Zn, Al, Si, Nb, Mo, W, Mg, Ca, Y, Ta, Pd, Ag, Au, Cd, In, Sn, Bi, La, Ce, and Mm; where A and B are different from each other and a is from 1.0 to 2.5.

The only guidance provided by Laid Open European Application No. 02 93 660 in the selection of A components is that A is Zr, or a mixture of at least 30 atomic percent Zr, and the balance is one or more of the following: Ti, Hb, Si, and Al. The only guidance with respect to B is that B is V-Ni, Mo-Ni, or V-Ni-M in which M is another metal. In this Application, the subclasses of Zr-V-Ni, Zr-Mo-Ni, Mo-Ni, and Zr-V-Ni-M (where M is Mg, Ca, Y, Hf, Nb, Ta, Cr, Mo, W, Mn, Fe, Co, Pd, Cu, Ag, Xn, Cd, Al, Si, In, Sn, Bi, La, Ce, Mm, Pr, Nd, Th, or Sm) are particularly described. It is significant that Ti containing materials are excluded from this subclass, and that this application is silent as to any relationships and/or rules regarding the selection of the modifier or modifiers.

Another subclass disclosed in Laid Open European Application No. 02 93 660 is A'B'Ni, where Ai is Zr or at least 30 atomic percent Zr with one or more of the following elements: Ti, Hf, Al, and Si; and B' represents two or more elements chosen from the group consisting of Cr, Mn, Fe, and Co. This Application fails to disclose a modified, five or more component material based upon Ti-V-Zr-Ni-Cr, with additional metallic components to increase cycle life, cell voltage, capacity, discharge rate capability, low temperature performance, or any other desirable operational parameters.

C. Ti-V-Zr-Ni Type Materials

Another suitable class of electrochemical hydrogen storage alloys is the Ti-V-Zr-Ni type active materials used as the material of the negative electrode. These materials are disclosed in U.S. Pat. No. 4,551,400 (hereinafter the '400 Patent) to Krishna Sapru, Kuochih Hong, Michael A. Fetcenko, and Srinivasen Venkatesan, the contents of which are incorporated herein by reference. These materials reversibly form hydrides in order to store hydrogen. The materials used in the '400 Patent all utilize a generic Ti-V-Zr-Ni composition, where at least Ti, V, and Ni are present with at least one or more of Cr, Zr, and Al. The materials of the '400 Patent are multiphase materials, which may contain one or more $AB_2$ phases with $C_{14}$ and $C_{15}$ type structures. One composition specifically disclosed in the '400 Patent is $(TiV_{2-x}Ni_x)_{1-y}M_y$ where x is between 0.2 and 1.0; y is between 0.0 and 0.2; and M=Al or Zr.

Two other illustrative compositions in the '400 Patent illustrate the partial substitution of Ti by Zr and/or Cr;

$Ti_{2-x}Zr_xV_{4-y}Ni_y$ where Zr is partially substituted for Ti; x is between 0.0 and 1.5; and y is between 0.6 and 3.5; and $Ti_{1-x}Cr_xV_{2-y}Ni_y$ where Cr is partially substituted for Ti; x is between 0.0 and 0.75; and y is between 0.2 and 1.0.

It is, of course, understood from the '400 Patent, that both Zr and Cr may be partially substituted for Ti. Generally, the ratio $(Ti+Zr+Cr)/(V+Ni)$ is from about 0.40 to about 0.67 to retain the proper Ni morphology in the hydrogen storage alloy.

The '400 Patent, however, is silent regarding the effects of additives and modifiers beyond those discussed above and as to the interactions between these additives and modifiers.

Other Ti-V-Zr-Ni materials may also be used for a rechargeable hydrogen storage negative electrode. One such family of materials are those described in U.S. Pat. No. 4,728,586 (hereinafter the '586 Patent) to Srini Venkatesan, Benjamin Reichman, and Michael A. Fetcenko for "Enhanced Charge Retention Electrochemical Hydrogen Storage Alloys and an Enhanced Charge Retention Electrochemical Cell," the disclosure of which is incorporated herein by reference. The '586 Patent describes a specific sub-class of the Ti-V-Ni-Zr hydrogen storage alloys comprising Ti, V, Zr, Ni, and a fifth component, Cr.

In a particularly preferred exemplification of the '586 Patent, the hydrogen storage alloy has the composition $$(Ti_{0.33-x}Zr_xV_{0.67-y}Ni_y)_{1-z}Cr_z$$

where x is from 0.00 to 0.25, y is from 0.1 to 0.6, and z is an amount effective for electrochemical charge retention, generally greater than 0.05 and less that 0.20; preferably about 0.07. These alloys may be viewed stoichiometrically as comprising 80 atomic percent of an V-Ti-Zr-Ni moiety and up to 20 atomic percent Cr, where the ratio of (Ti+Zr+Cr+optional modifiers) to (Ni+V+optional modifiers) is between 0.40 to 0.67. The '586 patent, while mentioning the possibility of additives and modifiers beyond the Ti, V, Zr, Ni, and Cr components of the alloys, are silent as to specific additives and modifiers, the amounts and interactions of the modifiers, and the particular benefits that could be expected from the modifiers.

A strong motivation for using the above described V-Ti-Zr-Ni family of electrochemical hydrogen storage alloys, as described in the '586 Patent is the inherently higher discharge rate capability of the materials. Important physical properties in this regard are the substantially higher surface areas for the V-Ti-Zr-Ni materials, and the metal/electrolyte interface. Measured in surface roughness factor (total surface area divided by geometric surface area), the V-Ti-Zr-Ni materials can have roughness factors of about 10,000. The very high surface area plays an important role in the inherently high rate capability of these materials.

The metal/electrolyte interface also has a characteristic surface roughness. The characteristic surface roughness for a given negative electrode electrochemical hydrogen storage material is important because of the interaction of the physical and chemical properties of the host metals, as well as of the alloys and crystallographic phases of the alloys, in an alkaline environment. The microscopic chemical, physical, and crystallographic parameters of the individual phases within the hydrogen storage alloy material are believed to be important in determining the macroscopic electrochemical characteristics of the hydrogen storage material. Since all of the elements, as well as many alloys and phases thereof, are present throughout the metal, they are also represented at the surfaces and at cracks which form the metal/electrolyte interface.

In addition to the physical nature of the roughened surface, it has been observed that the V-Ti-Zr-Ni materials tend to reach a steady state surface condition and particle size. This steady state surface condition is characterized by a relatively high concentration of metallic nickel. These observations are consistent with a relatively high rate of removal of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface, having a conductive and catalytic component, e.g., the metallic nickel, appears to interact with chromium alloys, in catalyzing various hydride and dehydride reaction steps. To a large extent, many electrode processes, including competing electrode processes, are controlled by the presence of chromium in the hydrogen storage alloy material, as disclosed in the '586 Patent.

Another reference that discussed the Ti-V-Zr-Ni class of materials is U.S. Pat. No. 4,849,205 to Kuochih Hong (hereinafter Hong) for "Hydrogen Storage Hydride Electrode Materials." Hong discloses four separate types of materials, each having four or five main components.

Hong's first material has the general formula $$Ti_aZr_bNi_cCr_dM_x$$

(hereinafter formula 1) where $0.1 < a \leq 1.4$; $0.1 < b \leq 1.3$; $0.25 < c \leq 1.95$; $0.1 < d \leq 1.4$; $0.0 < x \leq 0.20$; $a+b+c+d=3$; and M=Al, Si, V, Mn, Fe, Co, Cu, Nb, of Ln's. Hong describes exemplary materials of formula 1 that have four components: Ti, Zr, Ni, and Cr, where up to 17 percent of the material is Cr. There is only one five component exemplary material of formula 1 described in Hong. This material uses Mn at a concentration of approximately 3.2 percent; no other exemplary formulas using a modifier with the basic four component system of formula 1 are disclosed. The only documented benefit of the exemplary alloys of formula 1 is enhanced charge capacity. Other benefits of the formula 1 material are suggested, i.e. long cycle life, but there is no data presented to support this claim or any other improved operational parameter. Table 1 of Hong shows that the inclusion of Mn with the four component material of formula 1 reduces the charge capacity compared to the other exemplary materials of formula 1. Thus, Hong teaches away from the use of Mn in a metal hydride battery system.

The second class of materials taught by Hong is expressed by the general formula $$Ti_aCr_bZr_cNi_dV_{3-a-b-c-d}M_x$$

(hereinafter formula 2) where $0.1 < a \leq 1.4$; $0.1 < b \leq 1.2$; $0.1 < c \leq 1.3$; $0.2 < d \leq 1.95$; $0.4 < x \leq 0.20$; $0.4 < a+b+c+d \leq 2.9$; and M=Al, Si, Mn, Fe, Co, Cu, Nb, or Ln's. Most of Hong's exemplary formula 2 compounds have only five components: Ti, Zr, Ni, Cr, and V. There is only one six component exemplary material of formula 2 described. This material uses Cu as a modifier at a concentration of approximately 3.2 percent; no other exemplary compounds that use a modifier with the basic five component system of formula 2 are disclosed. The only documented benefit of the exemplary alloys of formula 2 is enhanced charge capacity. Other benefits of the formula 2 material are suggested, i.e. long cycle life and good rate capability, but there is no data presented to support this claim or show an improvement in any other operational parameter. Table 1 of Hong shows that the inclusion of Cu as a modifier with the basic five component material of formula 2 reduces the charge capacity compared to the other five component materials of formula 2. Thus, Hong teaches away from the use of Cu in a metal hydride battery system.

The third class of materials taught by Hong is expressed by the general formula $$Ti_aZr_bNi_cV_{3-a-b-c}M_x$$

(hereinafter formula 3) where $0.1 < a \leq 1.3$; $0.1 < b \leq 1.3$; $0.25 < c \leq 1.95$; $0.6 < a+b+c \leq 2.9$; $0.0 < x \leq 0.2$; if $x=0$, $a+b \neq 1.0$, and $0.24 < b \leq 1.3$; and M=Al, Si, Cr, Mn, Fe, Co, Cu, Nb, or Ln's. Most of Hong's exemplary formula 3 compounds have only four components: Ti, Zr, Ni, and V. There is only one five component exemplary material of formula 3 described in Hong. This material uses Cu as a modifier at a concentration of approximately 6.2 percent; no other exemplary compounds that use a modifier with the basic four component system of formula 3 are disclosed. The only data presented for improved performance for exemplary alloys of formula 3 is for enhanced charge capacity. However, Table 1 of Hong shows that the inclusion of Cu in the four component material of formula 3 reduces the charge capacity compared to the other four component materials of formula 3. Thus, Hong teaches away from the use of Cu in a metal hydride battery system.

Finally, the fourth class of materials taught by Hong is expressed by the general formula $$Ti_aMn_bV_cNi_dM_x$$

(hereinafter formula 4) where $0.1 < a \leq 1.6$; $0.1 < b \leq 1.6$; $0.1 < c \leq 1.7$; $0.2 < d \leq 2.0$; $a+b+c=3$; $0.0 < x \leq 0.2$; and M=Al, Si, Cr, Mn, Fe, Co, Cu, Nb, or Ln's. Most of Hong's exemplary formula 4 compounds have only four components: Ti, Mn, Ni, and V. There is only one five component exemplary material of formula 4 described in Hong. This material uses Co as a modifier at a concentration of approximately 3.2 percent; no other exemplary compounds that use a modifier with the basic four component system of formula 4 are disclosed. The only data presented for improved performance for exemplary alloys of formula 4 is for enhanced charge capacity. However, Table 1 of Hong shows that the inclusion of Co in the four component material of formula 4 reduces the charge capacity compared to the other four component materials of formula 4. Thus, Hong teaches away from the use of Co in a metal hydride battery system.

It is important to note that while Hong discloses a rather lengthy "laundry list" of possible modifier materials, only two can truly be considered modifiers: Cu and Co, since the addition of Mn is disclosed in formula 4. Yet, no data is presented that there is any benefit from the use of Cu or Co. In fact, Hong teaches away from these modifiers since he only demonstrates capacity improvement, and the use of Cu and Co substantially reduces capacity. In addition, Hong is silent as to the intended functions of any components. Since the remaining modifier materials disclosed by Hong are neither employed in exemplary compounds, nor are discussed in light of their possible benefits the teaching value of Hong's "laundry list" is minimal at best. This is because one of ordinary skill could not determine from Hong any possible advantages to be expected from using modifiers singly or together.

D. AB$_5$ Type of Hydrogen Storage Alloys

An alternative class of hydrogen storage alloys is the AB$_5$ hydrogen storage alloys. These alloys differ in chemistry, microstructure, and electrochemistry from the AB$_2$ and V-Ti-Zr-Ni-Cr types of electrochemical hydrogen storage alloys. Rechargeable batteries utilizing AB$_5$ type negative electrodes are described, for example, in (i) U.S. Pat. No. 3,874,928 to Will for "Hermetically Sealed Secondary Battery with Lanthanum Nickel Electrode;" (ii) U.S. Pat. No. 4,214,043 to Van Deuketom for "Rechargeable Electrochemical Cell;" (iii) U.S. Pat. No. 4,107,395 to Van Ommering, et al. for "Overchargeable Sealed Metal Oxide/Lanthanum Nickel Hydride Battery;" (iv) U.S. Pat. No. 4,107,405 to Annick Percheron né Guegon, et al. for "Electrode Materials Based on Lanthanum and Nickel and Electrochemical Uses of Such Materials;" (v) U.S. Pat. No. 4,112,199 to James D. Dunlop, et al. for "Lanthanum Nickel Hydride-Hydrogen/Metal Oxide Cell;" (vi) U.S. Pat. No. 4,125,688 to Bonaterre for "Negative Electrodes for Electric Cells" which discloses Hg modified LaNi$_5$ negative electrodes; (vii) U.S. Pat. No. 4,214,043 to von Deuketom for "Rechargeable Electrochemical Cell," which discloses a LaNi$_5$-Ni cell; (viii) U.S. Pat. No. 4,216,274 to Bruning for "Battery with Hydrogen Absorbing Material of the Formula LaM$_5$" which describes a rechargeable cell with an AB$_5$ type negative electrode of the formula LaM$_5$ where M is Co or Ni; (ix) U.S. Pat. No. 4,487,817 to Willems, et al. for "Electrochemical Cell Comprising Stable Hydride Forming Material;" which discloses an AB$_5$ type of material where A is chosen from mischmetal, Y, Ti, Hf, Zr, Ca, Th, La, and the rare earths, in which the total of Y, Ti, Hf, and Zr is less than 40 percent of the A component, and B is chosen from two or more members of the group of elements consisting of Ni, Cu, Co, Fe, and Mn, and at least one member of the group of elements consisting of Al, Cr, and Si; (x) U.S. Pat. No. 4,605,603 to Kanda, et al. for "Hermetically Sealed Metallic Oxide-Hydrogen Battery Using Hydrogen Storage Alloy," which discloses an AB$_5$ electrochemical hydrogen storage alloy having the formula $MNi_{5-(x+y)}Mn_xAl_y$, where M is chosen from the group consisting of lanthanum, lanthanides, and mischmetals, x and y are each between 0.0 and 1.0 and x+y is between 0.2 and 1.0; (xii) U.S. Pat. No. 4,696,873 to Yagasaki, et al. for "Rechargeable Electrochemical Cell with a Negative Electrode Comprising a Hydrogen Absorbing Alloy Including Rare Earth Component," which discloses AB$_5$ alloys of the mischmetal-Ni-Mn-Al type; and (xiii) U.S. Pat. No. 4,699,856 to Heuts, et al. for "Electrochemical Cell," which discloses an AB$_5$ material where A is chosen from mischmetal, Y, Ti, Hf, Zr, Ca, Th, La, and the rare earths, in which the total of Y, Ti, Hf, and Zr is less than 40 percent of the A component, B is chosen from two or more members of the group of Ni, Cu, Co, Fe, and Mn; at least one member of the group Al, Cr, and Si; including an activator chosen from the group consisting of Ni, Pd, Pt, Ir, and Rh.

It is clear from the above cited documents that the AB$_5$ type alloys are a distinct and specific class of materials. Extensive work on processing techniques and electrode cell design demonstrate the singularity of AB$_5$ technology, that is, that the AB$_5$ technology represents a separate field of inventive effort from the AB$_2$ and V-Ti-Zr-Ni-Cr classes of alloys. In particular, modification of AB$_5$ type alloys must be viewed as practical only within the specific AB$_5$ structure. This is due to the unique metallurgical, electrochemical, and oxidation characteristics of the AB$_5$ class of alloys, especially regarding the use of lanthanum and other rare earths for electrochemical applications. Further, there is no prior teaching or suggestion regarding the selection and role of modifiers generally for the AB$_5$ alloys or regarding specific performances that might result from specific modifiers.

E. Deficiencies of the Prior Art

While prior art hydrogen storage alloys frequently utilize various individual modifiers and combinations of modifiers to enhance properties, there is no clear teaching of the role of any individual modifier, or of the interaction or any modifier with other components of the alloy, or of the effects of any modifiers on specific operational parameters.

For electrochemical applications, which are substantially different from thermal hydrogen storage application, one must consider all performance attributes, such as cycle life, rate of discharge, discharge voltage, polarization, self discharge, low temperature capacity, and low temperature voltage.

While it is desirable to have alloys with all of these characteristics, it may also be advantageous to emphasize specific properties for a given application.

The prior art also fails to specify the role of particular modifications as well as how they work. Frequently, with AB$_2$ and AB$_5$ materials, there is a modifier, X, where X represents the rest of the Periodic Table. Such references teach away from the specific roles and functions of materials, and provide no practical benefit.

Further, the prior art does not consider the problem of excessive cell pressure that results from the use of hydrogen storage alloys in electrochemical cells; and hence, contains no teaching as to how these alloys might be modified to mitigate the problem.

As discussed above, charging and discharging hydrogen storage electrochemical cells involves the hydriding and dehydriding of metallic alloys concomitant with the electrolysis and reformation of water. These reactions involve the transfer of hydrogen atoms and during operation of the cells, particularly under conditions of high rate charge and discharge, significant hydrogen pressures can develop. Factors affecting hydrogen pressure in cell operation include the surface area of the cell electrodes, particularly the negative electrode; the formation of oxide layers on the electrodes; the catalytic activity of the oxides; and the equilibrium hydrogen pressure of the hydrided material. While the cells typically operate at pressures greater than atmospheric pressure, excessive hydrogen pressure is undesirable since it can result in a loss of aqueous-based electrolyte material, thereby limiting cell life. Also, if excess hydrogen pressure is not vented, the cell can burst, deform, or otherwise be destroyed.

Clearly, it is desirable to limit excessive hydrogen overpressure in electrochemical hydrogen storage cells; however, it is also equally important to maintain, or even improve, the other performance characteristics of the cells such as storage capacity, cycle life, self-discharge, and discharge rate. As described in detail below, the present invention is directed to improved alloys for use in hydrogen storage applications and particularly to alloys for use in hydrogen storage electrochemical cells, that have a low hydrogen overpressure during their operation. The alloys of the present invention also provide superior cell performance characteristics. These and other advantages of the present invention are readily apparent from the drawings, discussion, and description below.

SUMMARY OF THE INVENTION

An electrochemical hydrogen storage alloy of the present invention having decreased hydrogen overpressure and other improved desirable operational parameters, on an atomic percent basis, comprises: 14 to 22 percent vanadium; 28 to 39 percent nickel; 7 to 15 percent titanium; 15 to 34 percent zirconium; and at least one member selected from the group consisting of 0.01 to 7 percent chromium, 0.01 to 7 percent cobalt, 0.01 to 7 percent iron, 0.01 to 3.6 percent manganese, and 0.01 to 2.7 percent aluminum. This alloy of the invention is further characterized by the fact that the ratio of the vanadium to zirconium is in the range of 1:2.26 to 1:0.68.

Particular alloy compositions prepared in accord with the present invention include the following:

$V_{21}Ti_{10}Zr_{20}Ni_{31}Cr_6Co_6Fe_6$ $V_{21}Ti_{13}Zr_{17}Ni_{31}Cr_6Co_6Fe_6$ $V_{15}Ti_{15}Zr_{21}Ni_{31}Cr_6Co_6Fe_6$ $V_{18}Ti_{15}Zr_{18}Ni_{31}Cr_6Co_6Fe_6$ $V_{22}Ti_{11}Zr_{21}Ni_{39}Fe_7$ $V_{22}Ti_{11}Zr_{21}Ni_{32}Co_7Fe_7$ $V_{22}Ti_{15}Zr_{15}Ni_{32}Cr_6Co_6Fe_3$

Another aspect of the present invention is an electrochemical cell having a negative electrode formed of the hydrogen storage alloy described above having a plurality of hydrogen storing elements and at least one modifying element where the plurality of hydrogen storing elements and the at least one modifying element are selected to optimize desirable operational parameter(s) of cell performance. In the present invention, the improvement to such cells results from the presence of hydrogen storing elements in the negative electrode alloy in a ratio that optimizes hydrogen overpressure during operation of the cell. In one particular embodiment, the hydrogen storing elements in the alloy include vanadium and zirconium and the atomic ratio of vanadium to zirconium is in the range of 1:2.26 to 1:0.68. In another embodiment, the hydrogen storing elements further include titanium, and in yet another embodiment, the modifying elements may include at least one member selected from the group consisting of nickel, chromium, cobalt, iron, aluminum, and manganese.

Another aspect of the present invention involves a method for optimizing the composition of an electrochemical, hydrogen storage alloy for use in a negative electrode of an electrochemical cell exhibiting reduced hydrogen overpressure by selecting the hydrogen storage alloy described above.

Yet another aspect of this invention is a method for optimizing the composition of an electrochemical, hydrogen storage alloy for use in a negative electrode of an electrochemical cell so that the cell exhibits both reduced hydrogen overpressure and low self discharge.

This is accomplished by using a hydrogen storage alloy having a heterogeneous, disordered microstructure resulting from changes in the mutual solubility of the elements of the alloy where hydrogen in a particular phase is not easily discharged either through low surface area or an oxide of limited porosity or catalytic property.

Still another aspect of this invention is an electrochemical hydrogen storage alloy having a reduced self-discharge rate comprising the following composition where $x'$ is between 1.8 and 2.2; x is between 0 and 1.5; $y'$ is between 3.6 and 4.4; y is between 0.6 and 3.5; z is between 0.00 and 1.44; a designates that the V-Ni-Ti-Zr-Cr component, $(V_{y'-y}Ni_yTi_{x'-x}Zr_xCr_z)$, as a group, is at least 70 atomic percent of the alloy; $M'$, $M''$, $M^{iii}$, and $M^{iv}$ are modifiers chosen from the group consisting of Al, Mn, Mo, Cu, W, Fe, Co, and combinations thereof; and b, c, d, and e are modifier concentrations in the alloy; and having a heterogeneous, disordered microstructure resulting from changes in the mutual solubility of the $(V_{y'-y}Ni_yTi_{x'-x}Zr_xCr_z)$ group and the modifiers where hydrogen in a particular phase is not easily discharged either through low surface area or an oxide of limited porosity or catalytic property. These materials may also be used in combination with improved separators to further enhance charge retention.

DETAILED DESCRIPTION OF THE INVENTION

In accordance with the present invention, it has been found that the composition of electrochemical hydrogen storage alloys may be optimized to reduce the hydrogen overpressure occurring when these alloys are incorporated into electrochemical cells, and that such optimization may be accomplished without any sacrifice of other desirable operational parameters such as charge rate, discharge rate, or cycle life. It has also been found that the principles of the present invention have particular applicability to electrochemical hydrogen storage alloy materials which comprise V, Ni, Ti, and Zr together with one or more modifiers such as Cr, Co, Fe, Mn, and Al.

The present invention recognizes that in an embodiment of this invention, V, Ti, and Zr are the hydrogen storing elements of the alloy and the remaining components serve to modify other operational parameters of the material. It has also been found that the greatest hydrogen binding affinity is manifested by the Zr, the next greatest affinity by the V, and the next greatest affinity by the Ti. It has further been found that by manipulating the ratios of the hydrogen storing elements, the thermodynamic properties of the alloy with regard to hydride formation and decomposition may be selectively controlled. In general, the amounts of the remaining non-hydrogen storing, i.e. modifying, elements are left constant. When hydrogen storage elements are varied in this manner, it has been found that the other desirable operational parameters of the alloy generally remain unchanged or are improved. Thus, in accordance with the principles of the present invention, it has been found that it is not necessary to change concentrations of all of the hydrogen storing elements of the alloy in order to produce a reduction in the hydrogen overpressure in a cell utilizing such alloys. For example, in the system including V, Ti, and Zr, control of overpressure may be achieved by varying the ratio of V to Zr although it is envisioned that varied proportions of the hydrogen storing elements in general do not violate the spirit of the intended invention.

Specifically, in a system comprising V, Ni, Ti, Zr, and at least one element chosen from the group consisting of Cr, Co, Mn, and Al, it has been found that low hydrogen overpressure and good cell performance in terms of cycle life, cell capacity, and charge/discharge rate may be achieved when the alloy includes, on an atomic percent basis, 14 to 22 percent vanadium, 28 to 39 percent nickel, 7 to 15 percent titanium, 15 to 34 percent zirconium, and one or more of the following elements in the stated percentages: up to 7 percent chromium, up to 7 percent cobalt, up to 7 percent iron, up to 3.6 percent manganese, and up to 2.7 percent aluminum. More specifically, it has been found that alloys of the foregoing type in which the ratio of vanadium to zirconium is in the range of 1:2.26 to 1:0.68 provide optimum performance.

In addition, it has surprisingly been found that a very low self-discharge metal hydride alloy can be produced where the alloy has a heterogeneous, disordered microstructure resulting from changes in the mutual solubility of the elements of the particular composition. Essentially, it appears that in such low self-discharge alloys, hydrogen in a particular phase is not easily discharged either though low surface area, or an oxide of limited porosity or catalytic property; and one phase may be acting as a "funnel" for the other less catalytic phase. Thus, self-discharge tends to decrease. In addition, the self-discharge rate of such heterogeneous metal hydride materials can be further improved through the use of a polypropylene separator.

A preferred embodiment of a very low self-discharge alloy uses a V-Ti-Zr-Ni -Cr type electrochemical hydrogen storage alloy, as described in copending U.S. patent application Ser. No. 07/442,488, filed Nov. 24, 1989, that has a heterogeneous microstructure as described above. In this V-Ti-Zr-Ni-Cr type electrochemical hydrogen storage alloy, V, Ti, Zr, Ni, and Cr are, individually or collectively, partially replaced by one or more modifers where the alloy has the composition:

where $x'$ is between 1.8 and 2.2; x is between 0 and 1.5; $y'$ is between 3.6 and 4.4; y is between 0.6 and 3.5; z is between 0.00 and 1.44; a designates that the V-Ni-Ti-Zr-Cr component, $(V_{y'-y}Ni_yTi_{x'-x}Zr_xCr_z)$, as a group, is at least 70 atomic percent of the alloy; $M'$, $M''$, $M^{iii}$, and $M^{iv}$ are modifiers chosen from the group consisting of Al, Mn, Mo, Cu, W, Fe, Co, and combinations thereof; and b, c, d, and e are modifier concentrations in the alloy. The self-discharge rate of these heterogeneous metal hydride materials can also be further improved through the use of a polypropylene separator.

A most preferred embodiment of this invention is an alloy having the formula $V_{15}Ti_{15}Zr_{21}Ni_{31}Cr_6Co_6Fe_6$, with which a low hydrogen overpressure can be achieved in addition to a dramatic reduction in self discharge.

Other embodiments of the alloys of this invention involve activation of the alloys at any stage of their formation into negative electrodes, that is from alloy powder to formed electrode (including electrodes formed through sintering, cold bonding, or any other technique). Such activation involves a precharge, an alkaline etch treatment, or both a precharge and an alkaline etch treatment as described in U.S. Pat. No. 4,716,088, filed Dec. 29, 1986, the disclosure of which is incorporated by reference. This activation yields rechargeable hydrogen storage electrodes that are particularly suited for sealed, starved electrochemical cells.

A particularly preferred embodiment of an electrochemical cell constructed according to the present invention comprises a negative electrode formed using an alloy having the formula $V_{15}Ti_{15}Zr_{21}Ni_{31}Cr_6Co_6Fe_6$ and a polypropylene separator. Such an electrochemical cell exhibits a dramatic reduction in self-discharge (to about 30 percent compared to 50 percent), a dramatic pressure reduction, and a high cycle life.

Figure 1:
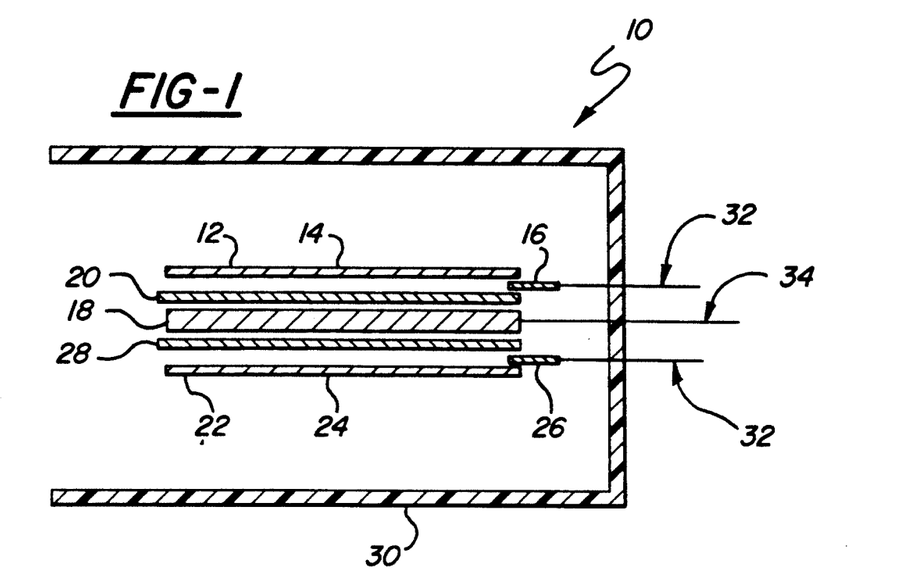
FIG. 1 describes a flat cell having a flat plate negative electrode.
Figure 2:
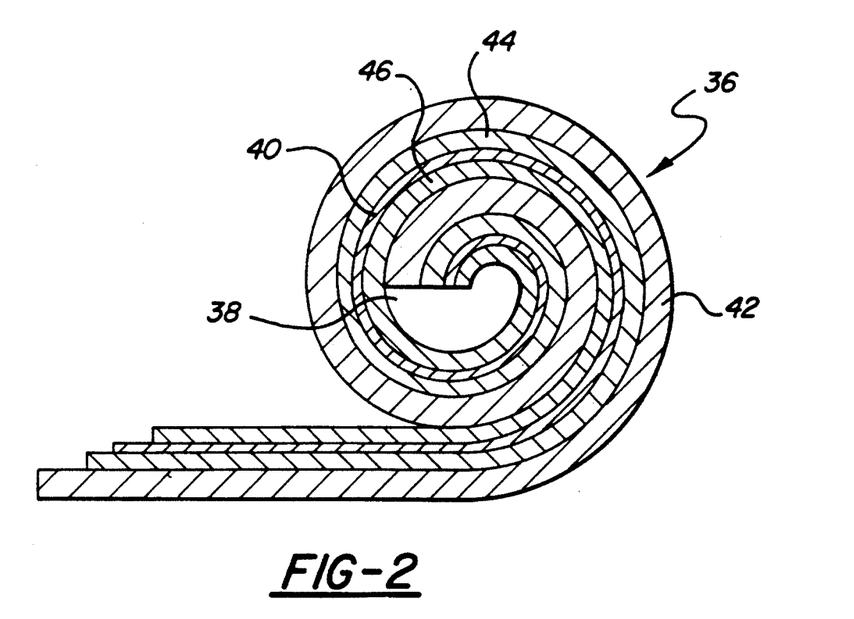
FIG. 2 describes a jelly roll type cell.

In general, the alloy material of the present invention may be utilized to fabricate hydrogen storage electrodes which may be advantageously employed in many types of cells and batteries. In FIGS. 1 and 2, various embodiments of electrochemical cells capable of utilizing a negative electrode fabricated from the alloys of the present invention are set forth.

In FIG. 1, a flat cell 10 is illustrated that includes a substantially flat plate negative electrode 12 in accordance with the invention. Electrode 12 includes a current collector 14 that is in electrical contact with the active material or the electrode 12, and a contact tab 16 in electrical communication with and electrical lead 32. Collector 14 and tab 16 may be made of suitably conductive metal such as nickel. The flat cell 10 includes a positive electrode, also referred to as a counter-electrode 18 which is substantially flat and aligned with the negative electrode 12. The positive electrode is typically a nickel or nickel/nickel hydroxide body and is in electrical communication with a conductive lead 34. A separator 20 is disposed between the counter-electrode 18 and the negative A second negative electrode 22 may be disposed in a spaced apart and aligned relationship with the counter-electrode 18 on a side opposite from the first negative electrode 12. The second negative electrode 22 is similar to the first negative electrode 12 and includes a current collector 24 which is in electrical contact with the active material of the second negative electrode 22. The second negative electrode further includes a contact tab 26, generally similar to the first contact tab 16, disposed in electrical communication with the second negative electrode 22 and with a current collecting lead 32. A second separator 28 is disposed between the negative electrode 22 and the counter-electrode 18. The electrodes 12, 18, and 22 are immersed in an appropriate electrolyte. One preferred electrolyte comprises potassium hydroxide, typically at a weight concentration of approximately 30 percent. Cell 10 in FIG. 1 may be contained in a suitable housing such as a plastic or metal container 30 which does not deteriorate or react with the cell electrolyte and which allows venting of the cell 10 should it produce an overpressure beyond a predetermined limit during its operation.

FIG. 2 illustrates a commercially preferred jelly-roll type cell 36 that is made by spirally winding a flat cell about an axis 38. The jelly-roll cell 36 includes an electrically conductive layer 40, a negative electrode 42, a separator 44, and a positive electrode 46, all generally similar to the corresponding parts of the cell described above. The electrically conductive layer 40, corresponds to the tab in the foregoing flat cell and serves to establish electrical communication with the negative electrode layer 42. The jelly-roll cell 36 may be placed in a canister or other suitable container (not shown) and appropriate leads connected to the conductive layer 40 and positive electrode 46.

Clearly, various other configurations of cells and batteries may be structured in accordance with the principles of the present invention. The present invention is illustrated further by reference to the following non-limiting Examples.

EXAMPLES

EXAMPLE 1

A series of hydrogen storage alloy materials having the atomic compositions shown in Table 1 were prepared and subsequently fabricated into negative electrode materials for testing in electrochemical cells as described below.

TABLE 1

1. $V_{22}Ti_{16}Zr_{16}Ni_{32}Cr_7Co_7$
2. $V_{21}Ti_{15}Zr_{15}Ni_{31}Cr_6Co_6Fe_6$
3. $V_{21}Ti_{10}Zr_{20}Ni_{31}Cr_6Co_6Fe_6$
4. $V_{21}Ti_{13}Zr_{17}Ni_{31}Cr_6Co_6Fe_6$
5. $V_{15}Ti_{15}Zr_{21}Ni_{31}Cr_6Co_6Fe_6$
6. $V_{18}Ti_{15}Zr_{18}Ni_{31}Cr_6Co_6Fe_6$
7. $V_{22}Ti_{11}Zr_{21}Ni_{39}Fe_7$
8. $V_{22}Ti_{11}Zr_{21}Ni_{32}Co_7Fe_7$
9. $V_{22}Ti_{15}Zr_{15}Ni_{32}Cr_6Co_6Fe_3$

The alloys of Table 1 were prepared by weighing and mixing powders of the component elements into a graphite crucible. The crucible and its contents were placed in a vacuum furnace which was evacuated and then pressurized with approximately one atmosphere of argon. The crucible contents were melted by high frequency induction heating while under the argon atmosphere. The melting was carried out at a temperature of about 1500° C. until a uniform melt was obtained. At that time, the heating was terminated and the melt was allowed to solidify under the inert atmosphere.

The ingot of alloy material was then reduced in size in a multi-step process. The first step involved a hydriding/dehydriding process substantially as described in U.S. Pat. No. 4,983,756 entitled "Hydride Reactor Apparatus for Hydrogen Comminution of Metal Hydride Hydrogen Storage Alloy Material," the disclosure of which is specifically incorporated by reference. In this first step, the alloy was reduced in size to less than 100 mesh. Subsequently, the material obtained from the hydride/dehydride process was further reduced in size by an impact milling process in which the particles were tangentially and radially accelerated against an impact block. This process is described in U.S. Pat. No. 4,915,898 entitled "Improved Method for the Continuous Fabrication of Comminuted Hydrogen Storage Alloy Negative Electrode Material," the disclosure of which is specifically incorporated by reference.

A fraction of the alloy material having a particle size of less than 200 mesh and a mass average particle of about 400 mesh (38 microns) was recovered from the impact milling process and bonded to a nickel screen current collector by a process which involves disposing a layer of alloy material onto the current collector and compacting the powder and collector. Compacting was carried out under an inert atmosphere with two separate compaction steps, each at a pressure of about 16 tons per square inch. After compaction, the current collector and the powder adhered to it were sintered in an atmosphere of about 2 atomic percent hydrogen with the balance argon.

These negative electrode materials were activated using the alkaline etch treatment described in U.S. Pat. No. 4,716,088, discussed above.

The negative electrode materials prepared in this way were fabricated into electrochemical cells generally similar to those of FIG. 2. The negative electrode materials were trimmed to size and wound with polyamide (nylon) separators and nickel hydroxide positive electrodes to form jelly-roll cells which were placed in standard "C" size cell cans. A 30 weight percent KOH electrolyte solution was added to each cell and the cells sealed to form starved, sealed "C" cells. The can of each cell was punctured and a pressure measuring probe sealed therein. The cells were subjected to charging and discharging conditions and the increase in pressure in each cell measured. The data obtained from these tests is set forth in Table 2, below. Alloys No. 1 and No. 2 are embodiments of the prior art. Alloys No. 3 to No. 9 are embodiments of the present invention.

TABLE 2

| Alloy | over-charge (psi) | cycle life | high rate discharge (AH) | midpoint voltage (volts) |
|---|---|---|---|---|
| 1. $V_{22}Ti_{16}Zr_{16}Ni_{32}Cr_7Co_7$ | 75 | 450 | 3.32 | 1.10 |
| 2. $V_{21}Ti_{15}Zr_{15}Ni_{31}Cr_6Co_6Fe_6$ | 120 | 800+ | 3.54 | 1.10 |
| 3. $V_{21}Ti_{10}Zr_{20}Ni_{31}Cr_6Co_6Fe_6$ | 50 | 800+ | 3.15 | 1.05 |
| 4. $V_{21}Ti_{13}Zr_{17}Ni_{31}Cr_6Co_6Fe_6$ | 50 | 800+ | 3.26 | 1.05 |
| 5. $V_{15}Ti_{15}Zr_{21}Ni_{31}Cr_6Co_6Fe_6$ | 30 | 800+ | 2.94 | 1.03 |
| 6. $V_{18}Ti_{15}Zr_{18}Ni_{31}Cr_6Co_6Fe_6$ | 50 | 800+ | 3.36 | 1.08 |
| 7. $V_{22}Ti_{11}Zr_{21}Ni_{39}Fe_7$ | 40 | 800+ | 3.30 | 1.09 |
| 8. $V_{22}Ti_{11}Zr_{21}Ni_{32}Co_7Fe_7$ | 35 | 800+ | 3.27 | 1.05 |
| 9. $V_{22}Ti_{15}Zr_{15}Ni_{32}Cr_6Co_6Fe_3$ | 50 | 800+ | 3.62 | 1.06 |

It can be seen from Table 2 that pressure in cells of this type may be controlled by making relatively small modifications to the composition of the alloy. For example, alloy No. 2 represents a prior art material which can be used to prepare electrochemical cells having excellent properties in terms of cycle life, midpoint voltage, charge and discharge qualities, and the like. Under the test conditions described above, cells with negative electrodes formulated from this material had a hydrogen overpressure of approximately 100–150 p.s.i. In contrast, materials No. 5 and No. 6, which differ from material No. 2 only with regard to the V-Zr ratio, both exhibit lower hydrogen overpressure.

In accordance with the present invention, it has been found that the strength of the metal to hydrogen bond can be adjusted, and thus the hydrogen overpressure may be controlled by controlling the ratios of the hydrogen storing elements, vanadium, titanium, and zirconium in the alloy. Most particularly, it has been found that control of the vanadium/zirconium ratio provides a fine degree of control of the storage kinetics, and thus, the hydrogen overpressure of the material.

EXAMPLE 2

Alloy materials No. 5 and No. 6 were processed into negative electrode materials from which cells were prepared as described in Example 1, above.

These materials are fairly similar in composition yet alloy No. 5 exhibits enhanced charge retention compared to alloy No. 6; and alloy No. 6 has better high rate discharge than alloy No. 5. See, Table 3, below. Alloys No. 1 and No. 2 are presented for comparison.

TABLE 3

| Alloy | high rate discharge (AH) | 7 day charge retention |
|---|---|---|
| 1. $V_{22}Ti_{16}Zr_{16}Ni_{32}Cr_7Co_7$ | 3.32 | 70% |
| 2. $V_{21}Ti_{15}Zr_{15}Ni_{31}Cr_6Co_6Fe_6$ | 3.54 | 70% |
| 5. $V_{15}Ti_{15}Zr_{21}Ni_{31}Cr_6Co_6Fe_6$ | 2.94 | 85% |
| 6. $V_{22}Ti_{15}Zr_{18}Ni_{31}Cr_6Co_6Fe_6$ | 3.36 | 72% |

The slight differences in composition of these two materials result in differences in their microstructure. That is, as the alloy varies from composition No. 5 to composition No. 6, there is a change in the mutual solubility of the various components of the alloy, and alloy No. 5 exhibits a multi-phase microstructure different from that of alloy No. 6, which is more homogeneous in nature, and this homogeneous microstructure results in an improved high rate discharge. In contrast, alloy No. 5 is within the mutual solubility limits of the materials and it forms a multi-phase disordered microstructure which results in a less significant improvement in charge retention.

Thus, this comparison demonstrates that by adjusting the proportions of the modifying elements while maintaining the proportions of the hydrogen storing elements, the alloy properties can be adjusted to control the chemical properties and microstructure of the material in order to control the charge retention.

EXAMPLE 3

Alloy materials No. 2 and No. 5 were processed into negative electrode materials from which cells were prepared as described in Example 1, above, except that rather that using only a polyamide (nylon) separator as described in Example 1, both nylon and polypropylene separators were used. The 30 day charge retention of these materials is presented in Table 4, below.

TABLE 4

| Alloy | 30 day charge retention nylon separator | 30 day charge retention, polypropylene separator |
|---|---|---|
| 2. $V_{21}Ti_{15}Zr_{15}Ni_{31}Cr_6Co_6Fe_6$ | 35% | 51% |
| 5. $V_{15}Ti_{15}Zr_{21}Ni_{31}Cr_6Co_6Fe_6$ | 57% | 69% |

Clearly, charge retention for these types of alloys can be enhanced by the use of a polypropylene separator rather than a nylon one, and the use of a polypropylene separator can be made in conjunction with specialized alloys designed for good charge retention. It should be noted that the polypropylene separator reduces the self-discharge by at least 10 percent even when used with all metal hydride cells.

Of course, as mentioned above, a negative electrode formed using alloy No. 5 and a polypropylene separator exhibited the most dramatic reduction in self-discharge (see, Table 4) as well as and in pressure reduction and a high cycle life (see, Table 1).

In view of the above, it is obvious to those skilled in the art that the present invention identifies and encompasses a range of alloy compositions which, when incorporated in the negative electrode of hydride type electrochemical cells, reduce the hydrogen overpressure and/or lower self-discharge. Further, various operational parameters of electrochemical hydrogen storage alloy materials may be independently controlled to optimize these alloys for particular cell applications in addition to optimizing the hydrogen overpressure and/or self-discharge.

In view of the above discussion, it is obvious that the alloys of the invention may be prepared by additional methods and by using additional compositions without departing from the spirit and scope of the present invention.

The drawings, discussion, descriptions, and examples of this specification are merely illustrative of particular embodiments of the invention and are not meant as limitations upon its practice. It is the following claims, including all equivalents, that define the scope of the invention.

What is claimed is:

1. An electrochemical hydrogen storage alloy comprising on an atomic percent basis:
   14 to 22 percent vanadium;
   28 to 39 percent nickel;
   7 to 15 percent titanium;
   15 to 34 percent zirconium; and
   at least one member selected from the group consisting of
   0.01 to 7 percent chromium,
   0.01 to 7 percent cobalt, and
   0.01 to 7 percent iron.

2. An electrochemical, hydrogen storage alloy as in claim 1, wherein the atomic ratio of the vanadium to zirconium is in the range of 1:2.26 to 1:0.68.

3. An electrochemical, hydrogen storage alloy as in claim 1, having the composition $V_{21}Ti_{10}Zr_{20}Ni_{31}Cr_6Co_6Fe_6$.

4. An electrochemical, hydrogen storage alloy as in claim 1, having the composition $V_{21}Ti_{13}Zr_{17}Ni_{31}Cr_6Co_6Fe_6$.

5. An electrochemical, hydrogen storage alloy as in claim 1, having the composition $V_{15}Ti_{15}Zr_{21}Ni_{31}Cr_6Co_6Fe_6$.

6. An electrochemical, hydrogen storage alloy as in claim 1, having the composition $V_{18}Ti_{15}Zr_{18}Ni_{31}Cr_6Co_6Fe_6$.

7. An electrochemical, hydrogen storage alloy as in claim 1, having the composition $V_{22}Ti_{11}Zr_{21}Ni_{39}Fe_7$.

8. An electrochemical, hydrogen storage alloy as in claim 1, having the composition $V_{22}Ti_{11}Zr_{21}Ni_{32}Co_7Fe_7$.

9. An electrochemical, hydrogen storage alloy as in claim 1, having the composition $V_{22}Ti_{15}Zr_{15}Ni_{32}Cr_6Co_6Fe_3$.

10. An negative electrode comprising an electrochemical hydrogen storage alloy, which on an atomic percent basis, comprises:
    14 to 22 percent vanadium;
    28 to 39 percent nickel;
    7 to 15 percent titanium;
    15 to 34 percent zirconium; and
    at least one member selected from the group consisting of
    0.01 to 7 percent chromium,
    0.01 to 7 percent cobalt, and
    0.01 to 7 percent iron, 11. The negative electrode comprising an electrochemical hydrogen storage alloy claimed in claim 10, wherein the atomic ratio of the vanadium to zirconium is in the range of 1:2.26 to 1:0.68.

12. An electrochemical cell which includes a negative electrode formed of a hydrogen storage alloy wherein said hydrogen storage alloy comprises:
    hydrogen storing elements consisting of 14 to 22 percent vanadium; 28 to 39 percent nickel; 7 to 15 percent titanium; 15 to 34 percent zirconium; present in a ratio that optimizes hydrogen overpressure during operation of said electrochemical cell; and
    at least one modifying element selected from the group consisting of 0.01 to 7 percent chromium, 0.01 to 7 percent cobalt, and 0.01 to 7 percent iron, selected to optimize desirable operational parameters of said electrochemical cell.

13. The electrochemical cell claimed in claim 12, wherein the atomic ratio of vanadium to zirconium is 1:2.26 to 1:0.68.

14. A method for optimizing the composition of an electrochemical, hydrogen storage material for use in a negative electrode of an electrochemical cell exhibiting reduced hydrogen overpressure and other desirable operational parameters comprising the steps of:
    selecting a hydrogen storage alloy comprising
        hydrogen storing elements consisting of 14 to 22 percent vanadium; 28 to 39 percent nickel; 7 to 15 percent titanium; 15 to 34 percent zirconium; and
        at least one modifying element selected from the group consisting of 0.01 to 7 percent chromium, 0.01 to 7 percent cobalt, and 0.01 to 7 percent iron; and
    adjusting the ratio of at least one pair of said hydrogen storing elements, to decrease the hydrogen overpressure during operation of said electrochemical cell, while keeping the ratio of said at least one modifying element unchanged to maintain a particular set of operational parameters for said electrochemical cell.

15. The method for optimizing the composition of an electrochemical, hydrogen storage material as claimed in claim 14, further comprising optimizing said hydrogen storage materials for use in a low pressure electrochemical cell by treating said hydrogen storage materials with an alkaline etch.

16. The method for optimizing the composition of an electrochemical, hydrogen storage material as claimed in claim 14, wherein said hydrogen storage material also exhibits a very low self-discharge, further comprising the step of
    selecting said hydrogen storage material having a heterogeneous, disordered microstructure resulting from changes in the mutual solubility of the said hydrogen storing elements and said at least one modifying element.

17. An electrochemical hydrogen storage alloy having a reduced self-discharge rate comprising:
    an alloy having a heterogeneous, disordered microstructure resulting from changes in the mutual solubility of the elements of said alloy, wherein hydrogen in a particular phase is not easily discharged either through low surface area, or an oxide of limited porosity or catalytic property.

* * * * *

UNITED STATES PATENT AND TRADEMARK OFFICE
CERTIFICATE OF CORRECTION

PATENT NO. : 5,238,756
DATED : August 24, 1993
INVENTOR(S) : Fetcenko, et al

It is certified that error appears in the above-indentified patent and that said Letters Patent is hereby corrected as shown below:

On the title page item [75], Inventor: after
"Kozp Kajita, Shiga Japan", add the following inventor:
--Hirota Masayuki, Osaka Japan--.

Signed and Sealed this

Twentieth Day of August, 1996

Attest:

BRUCE LEHMAN

*Attesting Officer*  *Commissioner of Patents and Trademarks*